United States Patent
Chen et al.

(10) Patent No.: US 8,821,970 B2
(45) Date of Patent: Sep. 2, 2014

(54) SLIP AGENT FOR PROTECTING GLASS

(75) Inventors: Jonathan Chen, Tainan (TW); Timothy Michael Gross, Big Flats, NY (US); David Alan Tammaro, Painted Post, NY (US); Liming Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1134 days.

(21) Appl. No.: 12/470,595

(22) Filed: May 22, 2009

(65) Prior Publication Data

US 2010/0297392 A1    Nov. 25, 2010

(51) Int. Cl.
  *C03C 17/28* (2006.01)
  *B65G 49/06* (2006.01)
  *C03C 17/00* (2006.01)
  *B05D 1/32* (2006.01)
  *B65D 85/48* (2006.01)

(52) U.S. Cl.
  CPC ............. *C03C 17/28* (2013.01); *C03C 2218/11* (2013.01); *B65G 49/069* (2013.01); *B65D 85/48* (2013.01); *C03C 17/006* (2013.01); *C03C 2217/40* (2013.01)
  USPC .................. 427/154; 65/24; 65/60.3; 65/61; 427/146; 427/152

(58) Field of Classification Search
  CPC .................................................. C03C 2217/40
  USPC ....................................... 427/133, 154; 65/24
  See application file for complete search history.

(56) References Cited

U.S. PATENT DOCUMENTS

| 3,349,900 | A | * | 10/1967 | Jones et al. | ..... 206/205 |
| 3,723,312 | A | * | 3/1973 | Hay, Jr. | ..... 508/506 |
| 4,892,774 | A |   | 1/1990 | Vallance | ..... 428/174 |
| 5,151,804 | A |   | 9/1992 | Verhulst et al. | ..... 359/56 |
| 5,695,876 | A | * | 12/1997 | Franz et al. | ..... 428/326 |

(Continued)

FOREIGN PATENT DOCUMENTS

| DE | 1 011 597 |    | 7/1957 |
| DE | 1 906 027 | A1 | 8/1969 |

(Continued)

OTHER PUBLICATIONS

Wade Jr. Organic Chemistry 5th Edition. Pearson Education, New Jersey, 2003 pp. 71-72, p. 968-969.*

(Continued)

*Primary Examiner* — Dah-Wei D Yuan
*Assistant Examiner* — Jose Hernandez-Diaz
(74) *Attorney, Agent, or Firm* — Ryan T. Hardee; Stephen S. Wentsler

(57) ABSTRACT

This disclosure features use of a paper or polymer film that includes a slip agent that can transfer to its surfaces. Once the paper or film is pressed against a glass sheet, this will leave a thin surface roughness of slip agent that can prevent or reduce glass surface scratches from other surfaces or particles during shipping or finishing (e.g., cutting to size, conveyance of glass), thereby improving the yield of glass shipments between glass forming plants and customers. The thin discontinuous layer of slip agent remaining on the glass surface can be washed off easily in subsequent washing processes. The paper or film can have the slip agent imbibed within the paper or coated on it as a surface member.

10 Claims, 6 Drawing Sheets

(56) References Cited

U.S. PATENT DOCUMENTS

| | | | |
|---|---|---|---|
| 6,025,015 A * | 2/2000 | Landry-Coltrain et al. | 427/130 |
| 6,174,990 B1 | 1/2001 | Noda | 528/361 |
| 6,379,746 B1 | 4/2002 | Birch et al. | 427/154 |
| 6,545,082 B2 | 4/2003 | Yasue | 524/500 |
| 6,715,316 B2 | 4/2004 | He et al. | 65/23 |
| 6,896,928 B2 | 5/2005 | Allaire et al. | 427/154 |
| 7,189,308 B2 | 3/2007 | Feit et al. | 162/180 |
| 7,390,099 B2 | 6/2008 | Takao et al. | 359/601 |
| 7,491,437 B1 | 2/2009 | Corradino et al. | 428/67 |
| 2002/0176988 A1 | 11/2002 | Medwick et al. | 428/408 |
| 2004/0089433 A1 | 5/2004 | Propst, Jr. et al. | 162/158 |
| 2005/0194279 A1 | 9/2005 | Coppola et al. | 206/454 |
| 2006/0246299 A1 | 11/2006 | Brady et al. | 428/426 |
| 2006/0246302 A1 * | 11/2006 | Brady et al. | 428/441 |

FOREIGN PATENT DOCUMENTS

| | | |
|---|---|---|
| DE | 21 61 379 A1 | 7/1972 |
| DE | 2 207 008 A1 | 9/1973 |
| DE | 41 03 283 A1 | 8/1992 |
| DE | 4103283 A * | 8/1992 |
| GB | 1 253 464 | 11/1971 |
| GB | 1253464 A * | 11/1971 |
| WO | 2008/002584 A1 | 9/2005 |
| WO | 2007/010276 | 1/2007 |

OTHER PUBLICATIONS

Wade Jr. Organic Chemistry 5$^{th}$ Edition. Pearson Education, New Jersey, 2003 pp. 71-72, p. 968-969.*

* cited by examiner

US 8,821,970 B2

SLIP AGENT FOR PROTECTING GLASS

TECHNICAL FIELD

The field is slip agents for protecting glass sheets from scratching.

TECHNICAL BACKGROUND

The shipment of display glass has employed surface protection of both substrate sides using a combination of laminated films with paper interleaf or more recently, a very clean single layer paper-only interleaf material. Referring to FIG. 1 (Prior art) in the former process, three sheets were used between adjacent glass sheets 10, 12 and 12, 14. Two outer layers of polymer film 16, 18 were coated onto facing surfaces 20, 22 of the glass, which sandwiched a sheet of paper 24 between them. The laminated film protection method requires a polymer film coater, films and a film peeler. This three layer interleaf adds extra process steps and sheets of material and increases manufacturing costs. It is highly desirable to use a single layer interleaf material to pack glass sheets at the bottom of the draw (BOD) in a fusion draw process, and to pack finished goods.

At the bottom of the draw the glass is unfinished and has sharp edges that chip easily during subsequent handling and finishing operations. This leads to an increased level of glass chips and other particles on the glass that can cause scratching of the glass during subsequent handling, finishing and shipping of the glass. The surface of the glass may also be scratched by the handling and finishing equipment itself, or by dirt and glass particles on or from the handling and finishing equipment and from other sources. It is desirable to protect the surface of the glass from scratching during handling, finishing and shipping operations downstream of the BOD.

TECHNICAL SUMMARY

In general, a method of protecting glass sheets from scratching comprises applying slip agent to a surface of a glass sheet before finishing and/or shipping operations. The slip agent can be present on the glass sheet in an amount ranging from 1 to 10,000 nanograms per centimeter$^2$. Scratching of the glass sheet is inhibited during the finishing and/or shipping operations using the slip agent. The slip agent can be formed as a discontinuous layer on the glass sheet. Application of the slip agent to the surface of the glass sheet can form surface roughness on the glass sheet comprising the slip agent. Part of the slip agent can be transferred onto particles present on the glass sheet, thereby protecting the surface of the glass sheet from scratching. Alternatively rolling or sliding of particles on the slip agent, rather than directly on the glass sheet, can prevent scratching of the glass sheet. The glass surface is cleaned to remove the slip agent and any particles on the glass sheet. The slip agent may be applied to the glass by any means, such as transfer using paper or film, spraying or dipping. Spraying or dipping may apply a thicker coating of slip agent on the glass sheet than transfer using paper or film.

Another aspect of this disclosure is a method of protecting glass sheets from scratching comprising applying a slip agent to a surface of a glass sheet before a finishing operation. The slip agent may form a discontinuous layer on the glass. The glass sheet has no lamination of slip agent containing material on it (e.g., no Visqueen film is laminated onto the glass during finishing). The slip agent comprises a long chain fatty ester or long chain fatty amide. Scratching of the glass sheet during the finishing and handling operations is inhibited using the discontinuous layer of slip agent.

Modification of an interleaf paper or polymer film with slip agent, followed by transfer of slip agent to the surface of glass sheets stacked in a temporary shipment package with the modified interleaf paper or polymer film between each glass sheet, provides the surface of the glass with a thin layer of slip agent that protects the glass surfaces from scratches during crate packing, in-plant handling and processing directly on horizontal finishing lines after the paper is removed for finishing. The slip agent transferred to the glass prevents scratches on a glass surface from bottom of the draw (BOD) to finishing (e.g. during shipment between glass forming plants), currently a problem for large sized (generation 8 and 10) glass, as well as shipment and handling to customers of the glass manufacturer. It is believed that the slip agent on the glass forms a micro surface roughness forming discontinuous layer on the surface of the glass. This disclosure refers to paper or film that is applied to the glass sheet for transfer of the slip agent to the glass sheet, and to interleaf paper or film that is disposed between sheets of glass, which may or may not transfer the slip agent to the glass sheet.

This disclosure features use of a carrier membrane, for example, a paper or polymer film that includes a slip agent that can transfer to the surface of the glass. Once the paper or film is pressed against the glass sheet, this will leave slip agent on the surface of the glass that can prevent or reduce glass surface scratches from other surfaces or particles during finishing (e.g., edge grinding), handling and shipping operations, thereby improving the yield of glass during finishing as well as during shipment between glass forming plants and customers. The slip agent remaining on the glass surface can be washed off easily in subsequent washing processes. The paper or film can have the slip agent imbibed within the paper or coated on it as a surface coating. Although the term "imbibe" is used to generally describe the presence of slip agent in the paper as by submerging in slip agent liquid, and "coating" for application of slip agent to the outside of the paper, the terms may be used interchangeably in this disclosure.

The specific slip agent can be a long chain fatty ester or a long chain fatty amide, for example, erucamide. The slip agent composition imbibed within or coated on the paper may include any other chemical agent that can be incorporated into paper to prevent scratches from inorganic particles while leaving residuals on the glass surfaces that also prevent scratching when present in very small amounts. The slip agent residuals are easily removed using standard glass washing processes and equipment This disclosure features methods of applying a slip agent onto the surface of a glass sheet, and the glass sheet itself that contains this slip agent on its surface. Various techniques can be used to apply the slip agent to the glass, such as compressing interleaf paper or polymer film containing the slip agent between adjacent glass sheets in a stack of glass sheets. Another technique to apply the slip agent to the glass sheet is to compress a paper or polymer film including the slip agent between pressure rollers and the glass on one or both sides of a glass sheet. Yet another way to apply the slip agent to the glass sheet is to laminate a slip agent containing polymer film to the glass sheet (e.g., Visqueen film) and then to strip the laminated film from the glass sheet before the finishing process. When the slip agent is applied to the glass sheets using the pressure roll process, laminated film process, or stacked glass with interleaf compression process, a first form of scratch protection to the glass sheets is provided. The slip agent that remains on the glass sheets offers the glass sheet first scratch protection along the finishing line where the glass sheet undergoes edge grinding and washing operations. When the slip agent imbibed or coated interleaf paper or polymer film is inserted between glass sheets in a stack, the slip agent offers a second form of protection against scratches from particles present between the glass sheets of the stack. The terms, first form of scratch protection and second form of scratch protection, are arbitrary terms used to differentiate between (a) preventing scratching of glass sheets in a stack using interleaf paper or film that is coated or imbibed with slip agent (second scratch protection) from (b) preventing scratching by leaving a slip agent on the glass surface, such as by transfer of slip agent from the paper or film and removal of the paper or film from the glass surface (first scratch protection).

In general, the method of protecting glass sheets from scratching can comprise positioning slip agent containing paper or polymer film on one of the glass sheets. The slip agent can be a long chain fatty ester or long chain fatty amide slip agent. The slip agent is present on at least the surface of the paper or film in contact with the glass sheet. The paper or film is pressed against or between the glass sheets and a small portion of the slip agent on the paper or film is transferred onto the glass sheets. The paper or film is then removed from the glass sheet, leaving the transferred slip agent on the glass providing the first scratch protection. The transfer of a portion of the slip agent onto the glass sheet can form surface roughness on the glass sheet comprising the slip agent. The first scratch protection provides protection against scratches during subsequent finishing and handling operations, such as along the finishing line, where scratching may be caused by rolls or rollers, steel cut tables, steel bars of glass separation devices associated with the cut tables, and other equipment. This scratching is resisted by moving particles (e.g., glass and other particles) against the slip agent rather than directly against the bare glass. The second scratch protection is provided when the paper or film is inserted between glass sheets within a stack, whereby scratching from glass particles or other particles is resisted by moving the particles against the slip agent on the paper rather than against the bare glass.

In applying the slip agent to the glass sheet via compression in a stack of glass, an additional glass sheet is placed against the paper (now referred to as interleaf paper as it is sandwiched between adjacent glass sheets) such that the slip agent is presented from the interleaf paper in contact with the additional glass sheet. The steps of positioning the interleaf paper against a glass sheet and applying another glass sheet on top of the interleaf paper are repeated until a stack of glass sheets is arranged with a sheet of interleaf paper between each pair of adjacent glass sheets. The steps of pressing the interleaf paper against the glass sheet and transferring the slip agent to the glass sheet occur when the interleaf paper located between the glass sheets is compressed as a result of a weight of the glass sheets in the stack. In the second form of scratch protection, scratching from glass or other particles between the glass sheets is resisted by moving (rolling or sliding) the particles against the slip agent on the interleaf paper while the interleaf paper is within the stack, rather than moving the particles on the glass. Alternatively, scratching may be prevented by keeping particles on the glass stationary and rolling or sliding the slip agent on the glass and particles. The first scratch protection can be achieved by slip agent that remains on the surface of the glass after separating the glass sheets of the stack and removing the interleaf paper. Therefore, the compression technique of applying slip agent to the glass sheet provides both the first and second forms of scratch protection.

Regarding details of the method, the interleaf paper or polymer film can comprise one interleaf sheet including slip agent protruding from (e.g. imbibed in or coated on) both sides of the interleaf sheet. Alternatively, the interleaf paper or film can comprise two interleaf sheets, each imbibed or coated on only one side with the slip agent and arranged such that the slip agent faces outwardly away from the other interleaf sheet. Now, scratching is avoided (second scratch protection) by the slip agent contacting the particles between the interleaf paper or film and the glass. Also, a portion of the slip agent is transferred to the glass sheet (first scratch protection). In both cases, scratching of the glass sheet is minimized by the slip agent.

Regarding further details of the method, the interleaf paper can be subjected to a super calendar operation, or not. The paper or film can comprise erucamide as the long chain fatty amide and an alkyl or alkenyl ketene sizing agent. The slip agent can be present on the glass sheet in an amount ranging from 1 to 10,000 nanograms per centimeter, more particularly, in an amount ranging from 1 to 3000 nanograms per centimeter$^2$, even more specifically, in an amount ranging from 1 to 500 nanograms per centimeter$^2$.

In a process of applying the slip agent from slip agent imbibed or coated paper or polymer film using rolls, the method includes providing on one or both sides of a glass sheet the paper or polymer film wound on a feed roll, with the paper or film extending from the feed roll to a take-up roll. Next, as the paper or film advances from the feed roll onto the take-up roll, the paper or film and the glass sheet are compressed between rollers on either side of the glass sheets, thereby pressing the paper or film against the surface of the glass sheet and transferring a portion of the slip agent to the surface of the glass. The paper or film is removed from contact with the glass sheet once the glass sheet passes through the rollers traveling to the take-up roll.

In another process of applying the slip agent to the glass sheet, a slip agent containing polymer film is applied as a laminate on the glass sheet and then the laminate film is stripped from the glass sheet to result in the transfer of slip agent to the glass sheet.

Another embodiment of this disclosure is a sheet of glass itself. The glass sheet comprises a slip agent distributed across a major surface of the glass by any means. The slip agent comprises a long chain fatty ester or a long chain fatty amide. The slip agent is distributed on the glass sheet in an amount ranging from 1 to 10,000 nanograms per centimeter$^2$, more particularly, in an amount ranging from 1 to 3000 nanograms per centimeter$^2$, even more specifically, in an amount ranging from 1 to 500 nanograms per centimeter$^2$. The slip agent can be formed as a discontinuous layer on the glass sheet. The slip agent can be discontinuously distributed across the major surface(s) of the glass sheet as a surface roughness comprising the slip agent. The long chain fatty amide can comprise erucamide. Compounded into the paper or polymer film material, the slip agent acts as an internal lubricant that transfers to the surface where it is presented against the glass. In this disclosure, the lubrication is provided to surfaces of glass sheet onto which the slip agent is applied or otherwise transferred by the paper or polymer film material or by other means.

On the other hand, the interleaf paper or film can comprise two interleaf sheets, each coated or imbibed on only one side with the slip agent and arranged such that the slip agent coated side faces inwardly toward the other interleaf sheet. This enables the adjacent glass sheets of the stack to slip relative to each other as the slip agent of the two interleaf sheets between the adjacent glass sheets slide relative to each other, but the uncoated surfaces of the interleaf sheets do not slide relative to the glass sheets, thereby achieving the second scratch protection. In this case, the particles between the interleaf sheets and the glass do not move upon movement of the sheets, but rather movement occurs between the adjacent interleaf sheets away from the glass surfaces. However, when using this inwardly facing, single-side coated interleaf paper or film, slip agent would need to be separately applied to the glass sheets in order to achieve the first scratch protection, because the facing interleaf sheets would not transfer any slip agent to the glass sheets. When the slip agent coated or imbibed sides of the interleaf sheets face each other, this can be used for transfer between glass forming plants and temporary storage of glass within the same plant, not for use on the finishing line.

Prevention of scratches during handling and shipment using the slip agent at the surface of the interleaf provides the following advantages. It will yield improvement through scratch reduction. There will be a cost reduction through process simplification and film coating elimination. Scratching can be avoided using the paper or film at the bottom of the draw on difficult to protect unfinished glass having particle chips from unground edges and other sources. It is an inexpensive approach versus other alternatives. No additional surface washing techniques are needed to make the glass surface less active and remove particles that could scratch in subsequent washing and handling.

Many additional features, advantages and a fuller understanding of the invention will be had from the accompanying drawings and the detailed description that follows. It should be understood that the above Technical Summary provides a description in broad terms while the following Detailed Description provides a more narrow description and presents embodiments that should not be construed as necessary limitations of the broad invention as defined in the claims.

DETAILED DESCRIPTION

Figure 1:
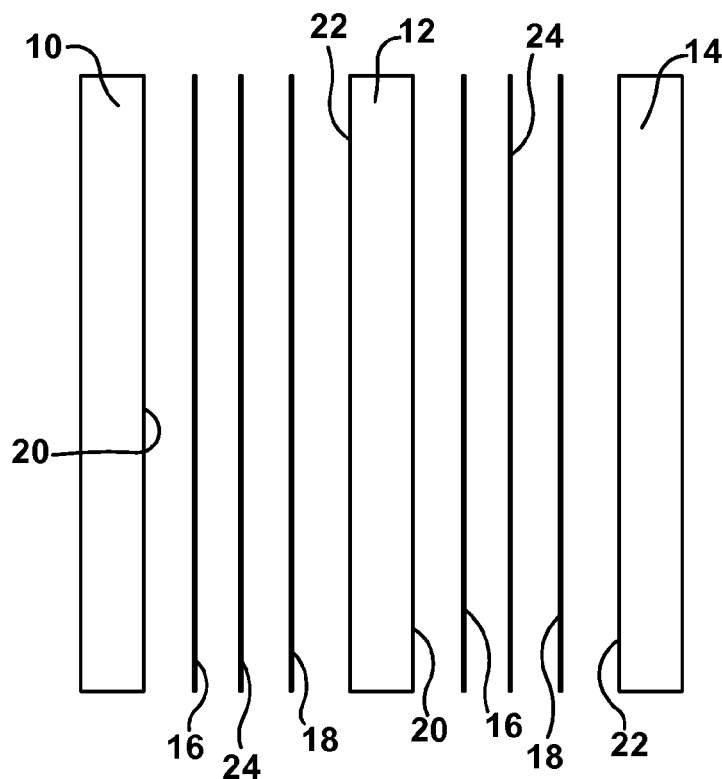
FIG. 1 is a view showing the prior art use of Visqueen film lamination on glass with a sheet of paper between the film (a three layer system)
Figure 2:
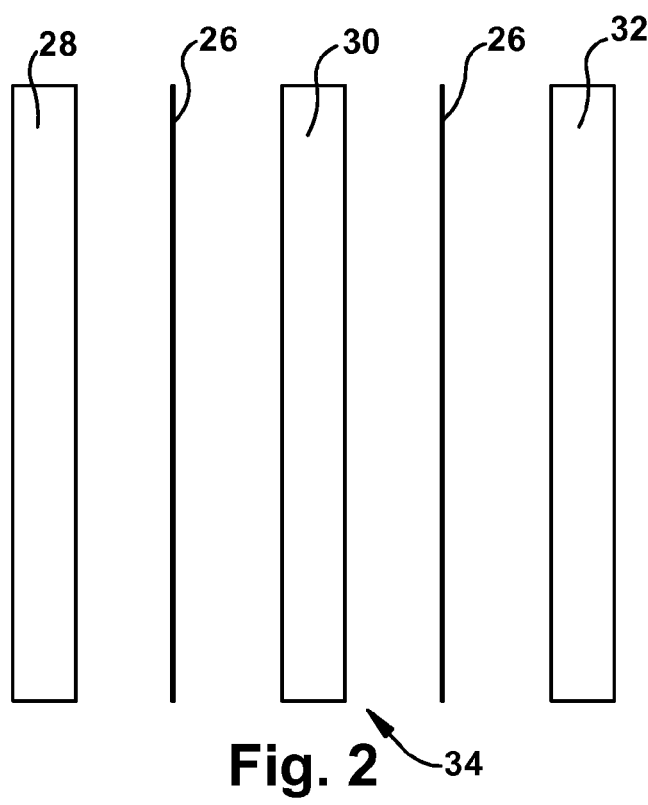
FIG. 2 is a view of a single interleaf paper or film between glass sheets.
Figure 3:
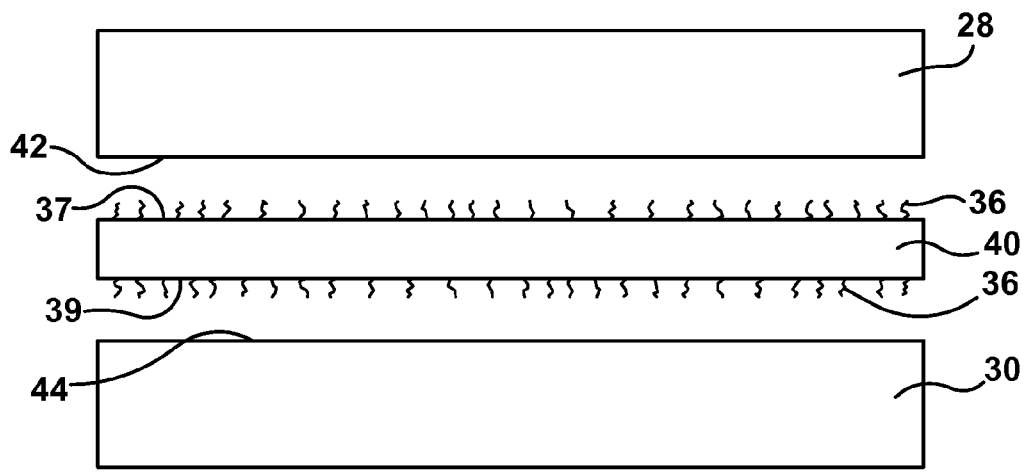
FIG. 3 is a view showing use of a double sided coated interleaf paper or film before application to the glass sheets.
Figure 4:
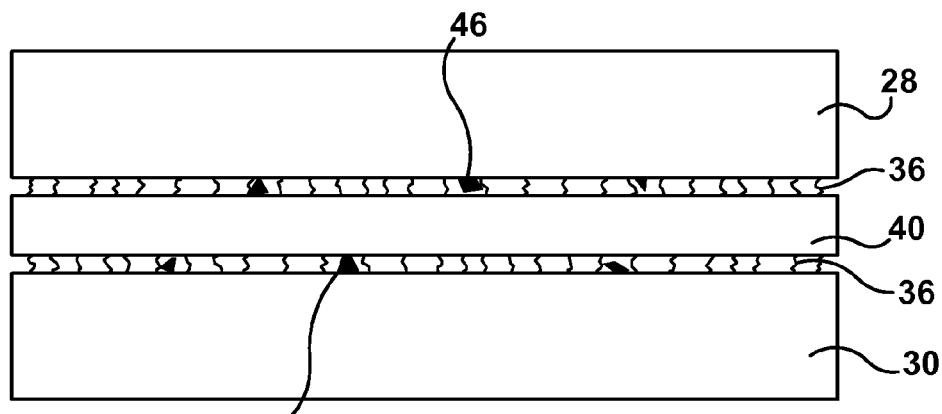
FIG. 4 shows a compressed stack of glass sheets and second scratch protection provided by the slip agent between the interleaf and the glass sheet.
Figure 5:
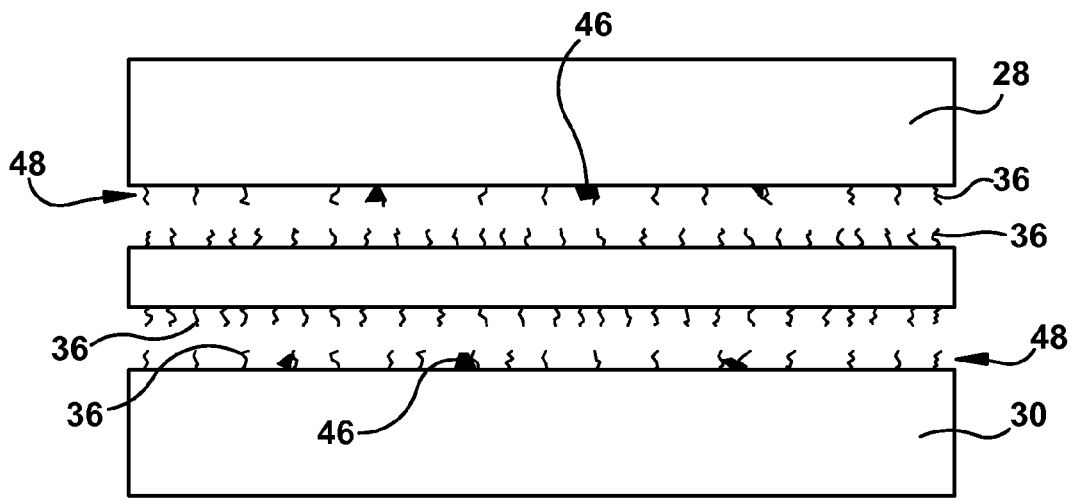
FIG. 5 shows separated glass sheets and first scratch protection provided on the glass sheets in the form of a slip agent surface roughness discontinuous layer.

Referring to FIG. 2, a slip agent can be applied to a glass sheet in one technique through compression when preparing a stack of glass sheets for shipment (hereinafter to be referred to as the "compression method"). As illustrated, a carrier membrane, for example, a single sheet of the interleaf paper or polymer film containing slip agent 26 is positioned between adjacent glass sheets 28, 30 and 30, 32 in a stack 34 of glass sheets (FIG. 4). A stack of glass sheets can include 100 or more sheets, for example. Referring to FIG. 3, slip agent protrudes from both sides 37, 39 of interleaf sheet 40 facing opposing surfaces 42, 44 of the glass sheets. When the interleaf sheet(s) 40 are compressed between the glass sheets 28, 30 due to the weight of the glass sheets in the stack (FIG. 4), a small portion of the slip agent is transferred to the surfaces 42, 44 of the glass. Upon unstacking of the glass sheets 28, 30 and separation of the interleaf paper or film from the glass sheets, the transferred portion of the slip agent remains on the glass sheets (FIG. 5) providing the first scratch protection for the glass. When the glass sheets are stacked with the interleaf sheet(s) 40 between the glass sheets 28, 30, the slip agent provides the second scratch protection for the glass sheets against any particles 46 located between the glass sheets during handling and storage of the stack of glass sheets.

Although the mechanics of the first and second scratch protection are not fully understood, it is believed particles such as glass chips may roll or slide upon the slip agent rather than on the bare glass, thereby preventing scratches on the glass. The slip agent may roll between the glass sheet and the interleaf paper or film, or it may coat particles that roll between the interleaf paper or film, or both.

While the slip agent protruding from the interleaf sheet or film and transferred onto the glass sheet is depicted in the figures, it will be appreciated that the slip agent, interleaf, and glass sheets are not to scale. Only nanogram amounts per centimeter$^2$ of the slip agent is transferred to the glass sheet. The slip agent may not actually resemble what is shown in the drawings. The slip agent molecules may be polar, which could help to align the molecules on the interleaf paper and film, and on the glass sheet. This may produce a glass sheet with surface roughness on one or both sides thereof. Interior glass sheets of the stack may include a discontinuous layer of slip agent that forms surface roughness layer on both sides of the glass sheet.

Figure 6:
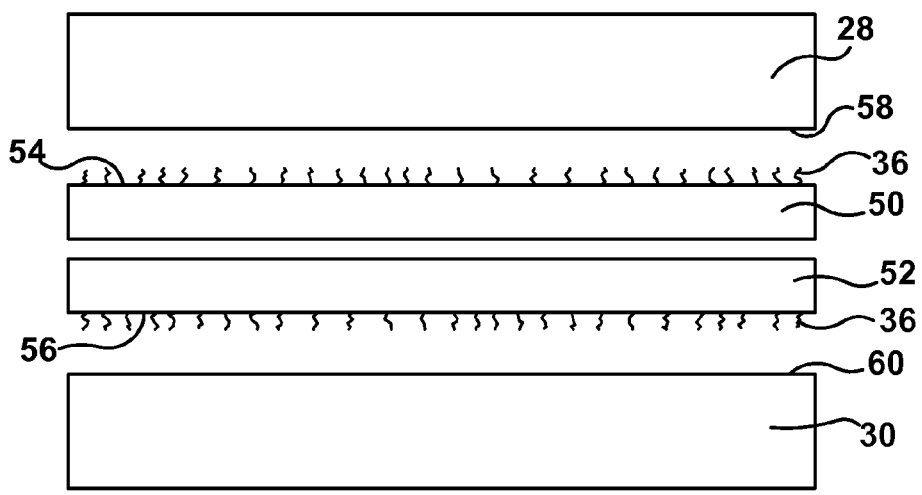
FIG. 6 is a view showing use of single side coated interleaf paper or film before application to the glass sheets in which one slip agent coating faces away from the coating of the other interleaf.

Another approach is to use the compression method to apply the slip agent when coated on only one side of an interleaf sheet. Two such single-sided interleaf sheets 50, 52 would be used. The interleaf sheets 50, 52 can be placed between two glass sheets with their slip agent coated sides facing outwardly away from each other, as shown in FIG. 6.

Figure 7:
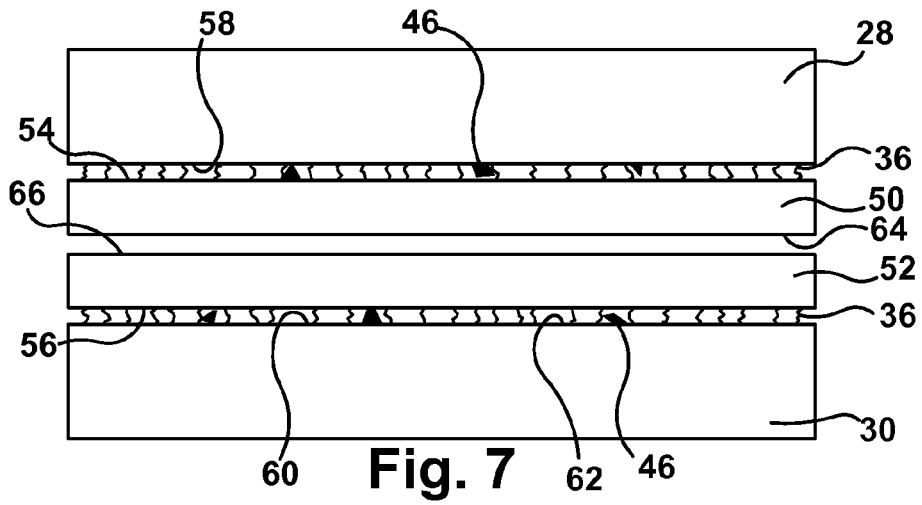
FIG. 7 shows a compressed stack of glass sheets and second scratch protection provided by the slip agent between each interleaf and the glass sheet.
Figure 8:
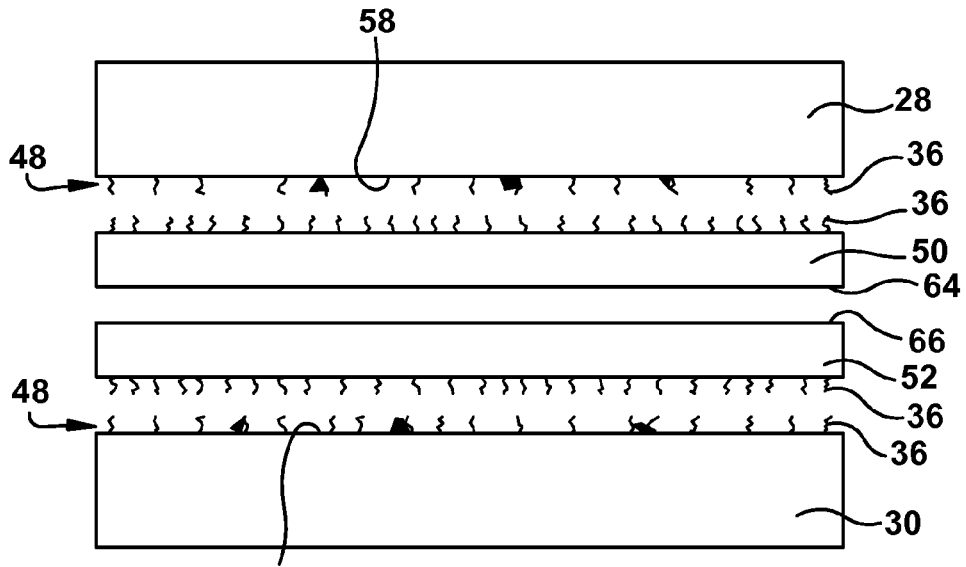
FIG. 8 shows separated glass sheets and first scratch protection provided on the glass sheets in the form of a slip agent surface roughness discontinuous layer.

Upon compression of the interleaf sheets between the two glass sheets 28, 30 due to the weight of the stack of glass sheets (FIG. 7), a portion of the slip agent is transferred to the glass sheets surfaces 58, 60 and provides second scratch protection. While the glass is stacked with interleaf sheets as shown in FIG. 7, particles such as glass chips 46 between the glass sheets can roll or slide on the slip agent 36 on the interleaf sheets 50, 52 instead of on the bare glass surfaces 58, 60, or the particle movement could be inhibited by the slip agent contact between the paper or film sheet and the glass sheet. The facing surfaces 64, 66 of the interleaf sheets may provide some slip in the stack, but the primary slip would be along the plane between the slip agent coated interleaf surfaces 54, 56 and the glass surfaces 58, 60. A portion of the slip agent is then transferred onto the inwardly opposing surfaces 58, 60 of adjacent glass sheets as shown in FIG. 8, providing the first scratch protection for the glass in which the particles roll or slide on the slip agent 48 remaining on the glass after the interleaf sheets 50, 52 have been removed from the glass sheets.

The compression method for applying the slip agent to the glass sheets via interleaf sheets placed between the sheets of glass in a stack of glass sheets offers second scratch protection to the glass sheets within the stack. That is, any glass particles from the cut edge (or other particles) that are located between the glass sheets will move against the slip agent on the interleaf sheets rather than against the bare glass, which prevents scratching of the glass when the glass sheets of the stack move relative each other. On the other hand, slip agent may be located between the glass sheet and the particles. Moreover, once the glass sheets of the stack are separated, the interleaf sheets are removed and the glass sheets are ready to be placed on the finishing line; the glass sheets contain the slip agent (first scratch protection). At this point, no interleaf sheets remain on the glass sheets during the finishing run. The glass sheets are solely protected by the slip agent on the surface of the glass. The interleaf paper that performed better than others as described in the examples below is one which was imbibed with or coated with erucamide as the long chain fatty amide as well as a sizing agent such as alkyl ketene dimer.

Another technique for applying slip agent to glass sheets disclosed herein is coating (laminating) a polymer film containing the slip agent to the glass sheet (e.g., Visqueen polymer film that includes erucamide slip agent) and then stripping the film from the glass sheet. After the film is stripped from the glass, some of the slip agent remains on the glass sheet. This provides the first form of scratch protection of the glass along the finishing line after the film has been removed.

In a process of applying the slip agent from the paper or polymer film to the glass sheets using rolls, the method includes providing on both sides of a glass sheet the paper or polymer film 80 wound on a feed roll 84, the paper or film extending from the feed roll to a take-up roll 82. Next, as the paper or film 80 advances onto the take-up rolls, the paper or film and the glass sheet 86 are compressed between rollers 88 on either side of the glass sheet (in a direction shown by arrows 90). The glass sheet moves in a direction 92. The glass sheet may also move in the opposite direction, opposite to the traveling direction of the paper or film. This presses the slip agent 36 protruding from the paper or film 80 onto the glass sheet 86 and transfers some slip agent 36 from the paper or film onto the glass sheet. The paper or polymer film is removed from the glass sheet once the sheet passes through the rollers and then it travels to the take-up roll where it is wound up. The paper or film may still contain a sufficient quantity of slip agent after contacting the glass sheet for enabling reuse of the paper or film to apply slip agent to additional glass sheets or it might only be used one time.

Figure 9:
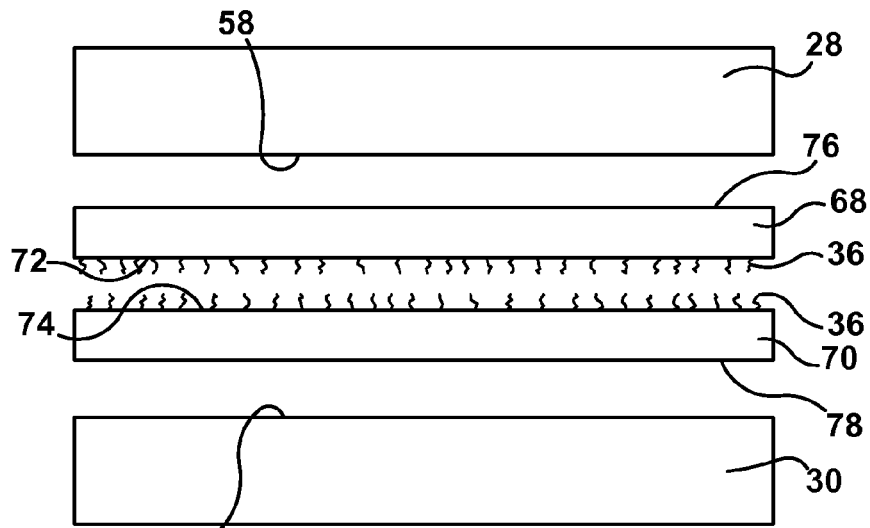
FIG. 9 is a view showing use of single side coated interleaf paper or film before application to the glass sheets in which one slip agent coating faces toward the coating of the other interleaf.
Figure 10:
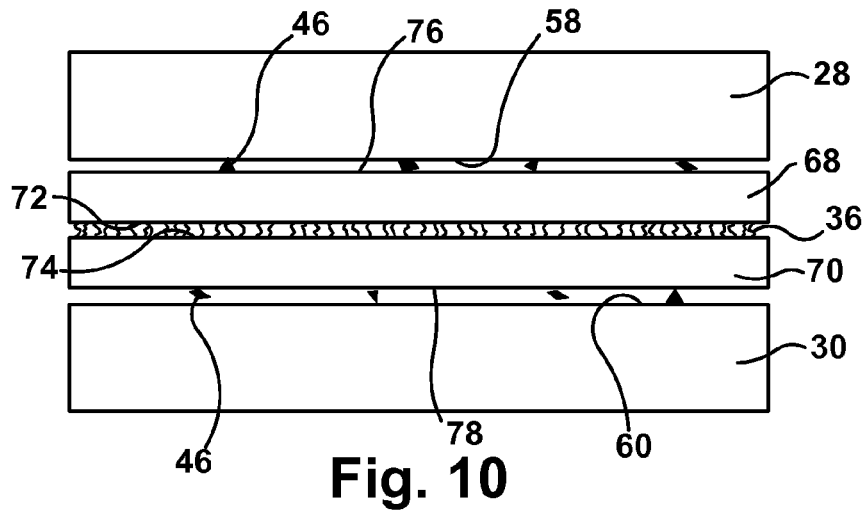
FIG. 10 shows a compressed stack of glass sheets and slippage between the interleaf sheets providing scratch protection.
Figure 11:
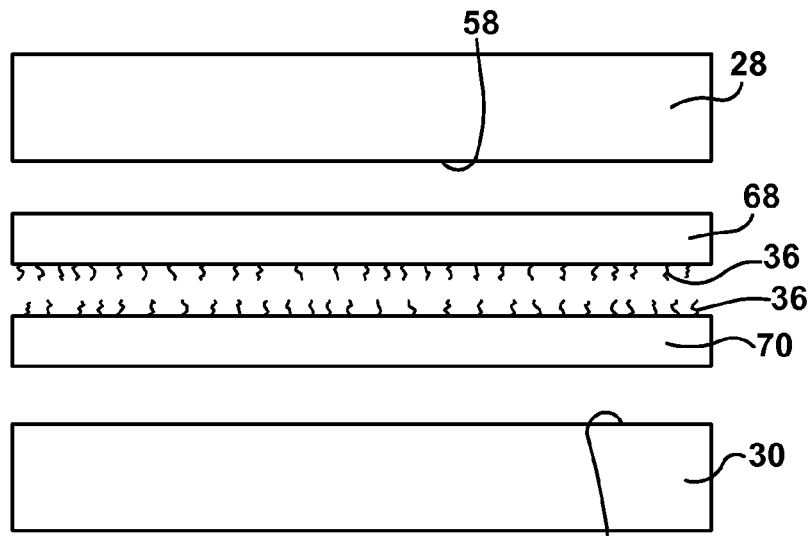
FIG. 11 shows the separated glass sheets and no slip agent surface roughness protection provided on the glass sheets.
Figure 12:
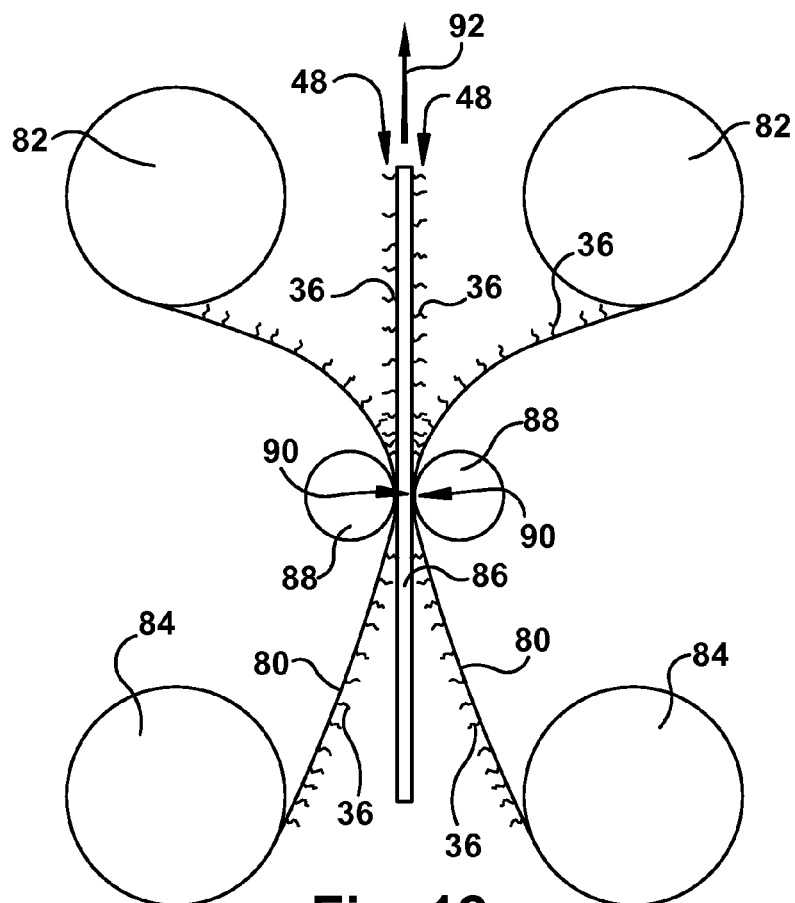
FIG. 12 shows a method of applying a slip agent surface roughness discontinuous layer to a glass sheet using rollers.

Two single-sided interleaf sheets 68, 70 between adjacent glass sheets in a stack of glass sheets, wherein the coated sides 72, 74 of two interleaf sheets are inwardly facing relative to each other (FIG. 9), may be employed to achieve the second scratch protection only for the glass sheets. The interleaf sheets have outer surfaces 76, 78 without slip agent facing the inner surfaces 58, 60 of the adjacent glass sheets. In this way, the friction where the two interleaf sheets' uncoated sides contact the sheets of glass is greater than the friction where the two interleaf sheets' coated sides contact each other. Upon compression of the interleaf sheets between the glass sheets as shown in FIG. 10 any particles 46 on the bare glass are prevented from scratching the glass because the principal movement between adjacent glass sheets is via slip agent 36 along the plane between the interleaf sheet surfaces 72, 74 (e.g. where friction is the lowest), thereby providing the second scratch protection of the glass. Once the glass sheets are separated no slip agent transfers to the opposing surfaces 58, 60 of the glass sheets (FIG. 11). If first scratch protection of the glass is desired for the finishing line after the interleaf sheets have been removed from the glass, then the slip agent would need to be applied to the surface of the glass sheets through another means.

The paper used in this disclosure is made using a Fourdrinier paper making machine and can be purchased from the Thilmany Pulp & Paper Company. An overview of a Fourdrinier machine is described in U.S. Pat. No. 7,189,308, which is incorporated herein by reference. The optional alkyl ketene dimer sizing agent is added at the wet end of the process. In addition, the slip agent can be added at the size press such as passing the paper through a bath including the sizing agent. Then, the paper passes through drier cans at a temperature exceeding a melting point of the erucamide. Next, at the dampener where water is added to obtain a proper curl of the paper, this is another location at which the slip agent can alternatively be added. At the dampener the slip agent can be coated onto one side of the paper. Then, the paper passes to the supercalendar, which squeezes the paper between opposing denim covered stainless steel rolls and stainless steel rolls. At this location fibers are locked down in the paper. The paper of this disclosure can be calendared or uncalendared. Then the paper travels to a rewinder. The slip agent can alternatively be coated onto the paper by spraying at the supercalendar or the rewinder. Suitable paper is described in publication WO 2008/002584, which is incorporated herein by reference.

The slip agent can be added to the paper as a dispersion (e.g., a wax dispersion) or an emulsion. The slip agent may be added as a solid to the polymer resin that forms the polymer film. Stable aqueous wax dispersions are disclosed in U.S. Pat. Nos. 5,743,949 and 4,481,038, which are incorporated herein by reference in their entireties. The supplier of the emulsion can also provide defoamer and surfactant in the slip agent emulsion or dispersion to facilitate application of the slip agent to the paper. A suitable defoamer is ethylene his distearamide.

Compounds that might be suitable as slip agents include at least one long chain fatty acid ester or fatty acid amide. The long chain fatty acid esters and fatty acid amides of this disclosure are derivatives of saturated and unsaturated normal fatty acids ranging from fourteen to thirty-six carbon atoms. Representative fatty acids are, for example, tetradecanoic, pentadecanoic, hexadecanoic, heptadecanoic, octadecanoic, nonadecanoic, eicosanoic, hencosanoic, decosanoic, tetracosanoic, pentacosanoic, tricosanoic, hexacosanoic, triacontanoic, dotriacontanoic, tetratriacontanoic, hentriacontanoic, pentatriacontanoic, hexatriacontanoic acids, myristic, palmitic, stearic, arachidic, behenic and hexatrieisocontanoic ($C_{36}$) acids, oleic, palmitoleic, linolenic and cetoleic, and the like.

Long chain fatty amides are preferred as slip agents, suitable slip agent might include one or more of the following: unsaturated fatty acid monoamide (e.g., oleamide, erucamide, recinoleamide); saturated fatty acid monoamide (preferably, lauramide, palmitamide, arachidamide, behenamide, stearamide, 12 hydroxy stearamide); N-substituted fatty acid amide (e.g., N-stearyl stearamide, N-behenyl behenamide, N-stearyl behenamide, N-behenyl stearamide, N-oleyl oleamide, N-oleyl stearamide, N-stearyl oleamide, N-stearyl erucamide, erucyl erucamide, erucyl stearamide, stearyl erucamide, N-oleyl palmitamide); methylol amide (e.g., methylol stearamide, methylol behenamide); unsaturated fatty acid bis-amide (e.g., ethylene bis-oleamide, hexamethylene bis-oleamide, N,N'-dioleyl adipamide, ethylene bis oleamide, N,N'-dioleyl sebacamide); saturated or unsaturated fatty acid tetra amide; and saturated fatty acid bis-amide (e.g., methylene bis-stearamide, ethylene bis-stearamide, ethylene bis-isostearamide, ethylene bis-hydroxystearamide, ethylene bis stearamide, ethylene bis-behenamide, hexamethylene bis-stearamide, hexamethylene bis-behenamide, hexamethylene bis-hydroxystearamide, N,N'-distearyl adipamide, N,N'-distearyl sebacamide).

Specific long chain fatty amides that may be suitable are erucamide, stearamide, oleamide and behenamide. Fatty amides are commercially available from Humko Chemical Company and include, for example Kemamide S (stearamide), Kemamide U (oleamide), Kemamide E (erucamide). In addition, fatty amides are commercially available from Croda Universal Ltd., and include, for example, Crodamide OR (oleamide), Crodamide ER (erucamide), Crodamide SR (stereamide), Crodamide BR (behenamide).

The sizing agent used herein is known as an alkyl ketene dimer (AKD); these types of sizing agents are described in U.S. Pat. No. 6,576,049, which is incorporated herein by reference in its entirety. Specific examples of AKD sizing agents that may be suitable in the present invention include but are not limited to octyl ketene dimer, dodecyl ketene dimer, tetradecyl ketene dimer, decyl ketene dimer, hexadecyl ketene dimer, eicosyl ketene dimer, docosyl ketene dimer, octadecyl ketene dimer, tetracosyl ketene dimer. Also included are those prepared from organic acids and mixtures of fatty acids such as those found in palmitoleic acid, rincinoleic acid, oleic acid, linoleic acid, linolenic acid, olive oil, coconut oil, palm oil, and peanut oil. Mixtures of any of such acids may also be used. AKD sizing agents can include but are not limited to those comprising at least one alkyl group comprising from about 8 to about 36 carbon atoms.

The slip agent can be washed off the glass at the finishing line using known washing processes and equipment, including brushes, ultrasound, water jet spraying, and detergent (e.g., potassium hydroxide detergent) at a pH of 10-12. The washing fluids will not dissolve the erucamide surface roughness, but it is nevertheless removed from the glass sheets by the mechanical action cleaning processes and devices of the finishing line.

This disclosure will now provide a description by way of the following examples, which are for the purpose of illustration and should not be interpreted to limit the invention as defined in the claims.

Example 1

The following conditions were evaluated: 2-sided erucamide imbibed paper in which the erucamide was applied at the size press (Condition 1); 1-sided erucamide imbibed paper in which the erucamide was applied at the size press (Condition 2); 2-sided erucamide imbibed paper in which the erucamide was applied at the size press, the paper including alkyl ketene dimer (AKD) (Condition 4); 2-sided stearamide imbibed paper in which the stearamide was applied at the size press, the paper including AKD (Condition 6); erucamide coated paper in which the erucamide was applied at the dampener (Condition 7); and stearamide coated paper in which the stearamide was applied at the dampener (Condition 8). The supercalendaring conditions were as indicated in the following Table 1. The number of nips in the supercalendar conditions refer to the number of rollers through which the paper passed and these rollers were either heated or cold as indicated. The erucamide and stearamide were applied to the paper as aqueous dispersions, wherein the 10% value indicates the concentration of the erucamide or stearamide in the dispersions.

TABLE 1

| # | Coating Condition Conditions | Supercalender Conditions | Lot Serial Number | Roll Width (Gen) | Roll Weight (kg) | Roll Length (m) |
|---|---|---|---|---|---|---|
| 8 | stearamide (10%) @ dampener | 5 nip cold stack | N2423275 | lab size | | |
| | | | N2423276 | Gen 5 | 311 | 3,658 |
| | | | N2423608 | Gen 8 | 468 | 2,713 |
| 7 | erucamide (10%) @ dampener | 6 nip cold stack | N2423279 | lab size | | |
| | | | N2423280 | Gen 5 | 172 | 1,981 |
| | | | N2423281 | Gen 8 | 311 | 1,829 |
| 1 | coated 2 side (C2S) erucamide (10%) @ size press | full hot stack | N2423266 | lab size | | |
| | | | N2423265 | Gen 5 | 336 | 3,975 |
| | | | N2423252 | Gen 8 | 476 | 2,900 |
| | | non-supercalendered | N2423269 | lab size | | |
| | | | N2423268 | Gen 5 | 325 | 3,975 |
| | | | N2423256 | Gen 8 | 462 | 2,900 |
| 2 | coated 1 side (C1S) erucamide (10%) @ size press | full hot stack | N2423261 | lab size | | |
| | | | N2423262 | Gen 5 | 321 | 3,975 |
| | | | N2423258 | Gen 8 | 468 | 2,900 |
| 4 | coated 2 side erucamide (10%) @ size press; with internal AKD | 5 nip hot stack | N2423272 | lab size | | |
| | | | N2423271 | Gen 5 | 180 | 2,134 |
| | | | N2423610 | Gen 8 | 468 | 2,896 |
| 6 | coated 2 side stearamide (10%) @ size press; with internal AKD | 5 nip hot stack | N2423202 | lab size | | |
| | | | N2423283 | Gen 8 | 251 | 1,554 |

TABLE 1-continued

| # | Coating Condition Conditions | Supercalender Conditions | Lot Serial Number | Roll Width (Gen) | Roll Weight (kg) | Roll Length (m) |
|---|---|---|---|---|---|---|
| 6 | coated 2 side stearamide (10%) @ size press; with internal AKD | non-supercalendered | N2423255 N2423254 | lab size Gen 8 | 288 | 1,783 |

The initial testing of the papers from the paper mill included coefficient of friction testing as shown below.

TABLE 2

Coefficient of Friction of Papers

| Condition | | Sheet Side | Sheffield Smoothness | COF to steel Test #1 | COF to steel Test #2 | COF average |
|---|---|---|---|---|---|---|
| WR-139 | Control | felt | 327 | 0.27 | 0.31 | 0.29 |
| | | wire | 347 | 0.29 | 0.31 | 0.30 |
| 1 | 2 sided Eruc SC | felt | 127 | 0.25 | 0.27 | 0.26 |
| | | wire | 152 | 0.29 | 0.29 | 0.29 |
| 1b | 2 sided Eruc NC | felt | 297 | 0.28 | 0.30 | 0.29 |
| | | wire | 321 | 0.27 | 0.23 | 0.25 |
| 2 | 1 sided Eruc SC | felt | 100 | 0.27 | 0.27 | 0.27 |
| | | wire | 115 | 0.24 | 0.29 | 0.27 |
| 2b | One sided Eruc NC | felt | 332 | 0.23 | 0.30 | 0.27 |
| | | wire | 335 | 0.26 | 0.27 | 0.27 |
| 3b | One sided Eruc NC w/AKD | felt | 338 | 0.29 | 0.31 | 0.30 |
| | | wire | 346 | 0.31 | 0.27 | 0.29 |
| 4 | 2 sided Eruc w/AKD SC | felt | 96 | 0.29 | 0.27 | 0.28 |
| | | wire | 122 | 0.29 | 0.22 | 0.26 |
| 4b | 2 sided Eruc w/AKD NC | felt | 344 | 0.25 | 0.23 | 0.24 |
| | | wire | 352 | 0.28 | 0.27 | 0.28 |
| 6 | 2 sided Stear-SC 5 nips | felt | 109 | 0.28 | 0.31 | 0.30 |
| | | wire | 150 | 0.30 | 0.25 | 0.28 |
| 6b | 2 sided Stearamide w/AKD NC | felt | 342 | 0.26 | 0.23 | 0.25 |
| | | wire | 362 | 0.30 | 0.28 | 0.29 |
| 7 | Eruc @ dampener SC | felt | 166 | 0.21 | 0.15 | 0.18 |
| | | wire | 172 | 0.27 | 0.29 | 0.28 |
| 7b | Eruc @ dampener NC | felt | 322 | 0.16 | 0.15 | 0.16 |
| | | wire | 327 | 0.30 | 0.26 | 0.28 |
| 8 | Stear @ dampener SC | felt | 143 | 0.26 | 0.27 | 0.27 |
| | | wire | 158 | 0.24 | 0.26 | 0.25 |
| 8b | Stearamide @ dampener NC | felt | 327 | 0.26 | 0.27 | 0.27 |
| | | wire | 341 | 0.26 | 0.24 | 0.25 |

*b samples are non-supercalendered

The coefficient of friction (COF) data support the understanding that the mechanism of action of the slip agent is not primarily by lowering the coefficient of friction. In Table 2, COF to steel means rubbing a steel plate across the paper to ascertain the COF. The above data shows that most papers have similar COF values. This includes un-coated paper. The only significantly lower COF results were obtained from the single sided dampener trial results (e.g. the slip agent was applied to the paper at the dampener), for both calendared and uncalendared papers. Therefore, COF alone is not responsible for the scratch protection differences to be shown later in this disclosure, produced by Condition 1 (2-sided erucamide imbibed paper in which the erucamide was applied at the size press) using supercalendared paper. This was supported by earlier testing using solid slip agents on glass versus the liquid slip agent, glycerol, in which the solid slip agents outperformed the liquid slip agents. Here the solid particles were better in scratch prevention, although both provided low COF. In addition, the supercalendar differences indicate that the calendared paper may not be driving the slip agent towards or away from the surfaces. Finally, from contact angle data discussed below, it was inferred that the dampener process results in the most slip agent on the felt-side paper surfaces, and that it does not migrate to the papers wire-side upon rolling.

Example 2

Testing of Coated Papers and Selection of 2-Sided Erucamide Coated Paper from the Supercalendar Process for Scale Up The paper-conditions that were deemed acceptable from the mill trial were Condition 1 (2-sided erucamide imbibed paper applied at the size press) and Condition 6 (2-sided stearamide imbibed paper applied at the size press and including AKD), with calendared and uncalendared paper available from each. Other conditions became useful primarily for later testing since there were line issues with foaming, coating pumping, coating concentration variations, and roll alignment during other conditions. Although the dampener trials were satisfactory, the 1-sided coatings were not used for scale-up, since at this time two sheets of coated paper per substrate had a high cost. Best results were obtained under Condition 4 (2-sided erucamide imbibed paper in which the erucamide was applied at the size press, the paper including AKD).

Stain testing was conducted using washed glass (e.g., 2% Semiclean KG solution at 45° C. for 15 minutes) having a low particle count, stacked for 16 hours at 50° C. and 85% relative humidity under a packing weight (e.g., 4.4 kg). Particle density of the glass sheets was measured after washing using ETHAN (or MDM2) inspection system.

A scratch test was developed to evaluate motion of the materials rubbed across the glass surface. As in stain testing, the glass sheets were 5×5 inches. The glass was washed and had a low particle count. This test used a simple flat-bottomed container with the material attached to the base to ride across the glass, not including glass chips, in a repeatable way. Loading, speed and number of passes can be controlled. Once the test was complete the results after washing were compared using a particle density instrument.

4 materials at the top of Table 3 were evaluated to choose candidates for on-line tests. All results are listed in particles per square centimeter left on glass surfaces after testing. Results of 10 or less for stain are acceptable, while scratch numbers below 40 are generally acceptable. All slip agents in Table 3 were applied at the size press except the two noted for the dampener application. The tests showed that stearamide had higher stain results compared to erucamide, which made erucamide a more suitable slip agent.

TABLE 3

Scratch and Stain Data for New Single Layer Materials

| Coated Paper Condition | Month 1 | | Month 2 | | Month 3 | |
|---|---|---|---|---|---|---|
| | Stain Average | Scratch Median | Stain Average | Scratch Median | Stain Average | Scratch Median |
| 2-Sided Stearamide w/AKD, SC; C6 | 39.2 | 11.9 | | | | |
| 2-Sided Stearamide w/AKD, no SC; C6 | 209 | 8.3 | | | 50.1 | |
| 2-Sided Erucamide, SC; C1 | 5.7 | 25.7 | | | | |
| 2-Sided Erucamide, no SC; C1 | 1.7 | 22.4 | | | | |
| Control, WR-139 Uncoated paper | 2.4 | 1 | 4.4 | 34.1 | 16 | |
| 1-sided Erucamide, size press; C2 | | | 4.1 | 3.5 | | |
| 2-sided Erucamide, w/AKD; C4 | | | 2.6 | 4.1 | | |
| 1-sided Erucamide, dampener; C7 | | | 9.6 | 30.9 | | |
| 1-sided Stearamide, dampener; C8 | | | 3.1 | 11.9 | | |
| ENW53B (2%) SL polymer | 4.1 | 10 | | | | |
| ENW53B (1.5%) SL polymer | 7.6 | 13.9 | | | | |

From Table 3, the best choices were from condition 1(C1), the 2-sided erucamide imbibed materials. Super-calendared (SC) and uncalendared versions of C1 were evaluated further. All scratch analysis results (Table 3) are shown to be in an acceptable range.

Stearamide with AKD, condition 6 (C6) stained the glass more than the erucamide. Later data (Table 5) will show stearamide was in higher concentration at the glass surface, before washing, compared to erucamide. The alkyl ketene dimer (AKD) used in C6 is a common sizing agent used in the paper industry. Addition of this less expensive material (AKD) was intended to bind to the paper interior and allow more slip agent to migrate to or remain at the surface. For erucamide imbibed in the paper at the size press, Condition 4 (C4), there was a higher amount of material found on glass surfaces after contact with AKD versus without AKD.

The Month 3 result listed in Table 3 for condition C1 was high (50.1), as was the control result (16) since these samples were aged for 2 weeks at 50° C. in a humidity chamber with dense pack loading (23 g/cm$^2$) and 50% relative humidity. This temperature effect has been observed by several techniques to bring more erucamide slip agent to the paper surface.

Also shown are limited results for the polymer single layer (SL) interleaf. Those results were based on 3 replicates per test, due to sample availability. Usually stain is based on 15 replicates, and scratch on at least 5 replicates. The sample was a single layer polymer film ("SL polymer film"; i.e., no other separate independent layers) that included three sublayers, one being a central medium density polyethylene core. The core was made of a foam of medium density polyethylene. Two outer skin layers of low density polyethylene sandwiched the core. The total film thickness ranged from about 70 to 120 microns.

Example 3

On Line Testing of 2-Sided Erucamide Coated Paper and Single Layer Polymer Paper Glass surfaces contacting one paper imbibed with erucamide ("Coated paper") and one single layer polymer film imbibed with erucamide ("SL polymer film") were compared along with glass surfaces contacting un-coated paper and glass surfaces with Visqueen film residue after peeling ("Manually peeled Visqueen film"). Generation 8 lots of 100 for each interleaf type were packed in separate crates then loaded onto the finishing line. The order of run may be relevant. The Visqueen peeled surfaces were run first while the uncoated paper was run second to be followed by the Coated paper and SL polymer film test materials. The Visqueen stripping left the most slip agent at the surface, while the uncoated paper left no slip agent protection. The expectation was that slip agent residue from Visqueen deposited on machine parts would be removed prior to testing the new materials by the glass packed in un-coated paper. Testing was carried out over two days with about a week of separation between tests, due to line availability. Results are listed in Table 4 below.

SIS is a known optical method for identifying defects in which defects are measured by strobing light onto the glass and locating the defects using a scanning camera. IPC is a similar known optical defect measurement technique. Controllable yield was the number of glass sheets that included a critical defect that would have required scrapping or recutting of the glass sheet divided by the total number of glass sheets tested.

TABLE 4

| Sample | Input Sheets | Controllable Yield | SIS Defect Counts | IPC |
|---|---|---|---|---|
| 1) | | | | |
| Peeled Visqueen Film | 49 | 100% | 150-190 | |
| Uncoated Paper | 99 | 84% | 1000-1400 | |
| Coated Paper | 100 | 97% | 120-170 | |
| SL Polymer Film | 30 | 90% | 30-450 | |
| 2) | | | | |
| Peeled Visqueen Film | 50 | 100% | 100-130 | 0.006 |
| Uncoated Paper | 100 | 67% | 1000-1200 | 0.012 |
| SL Polymer Film | 74 | 90% | 120-180 | 0.017 |

Figure 13:
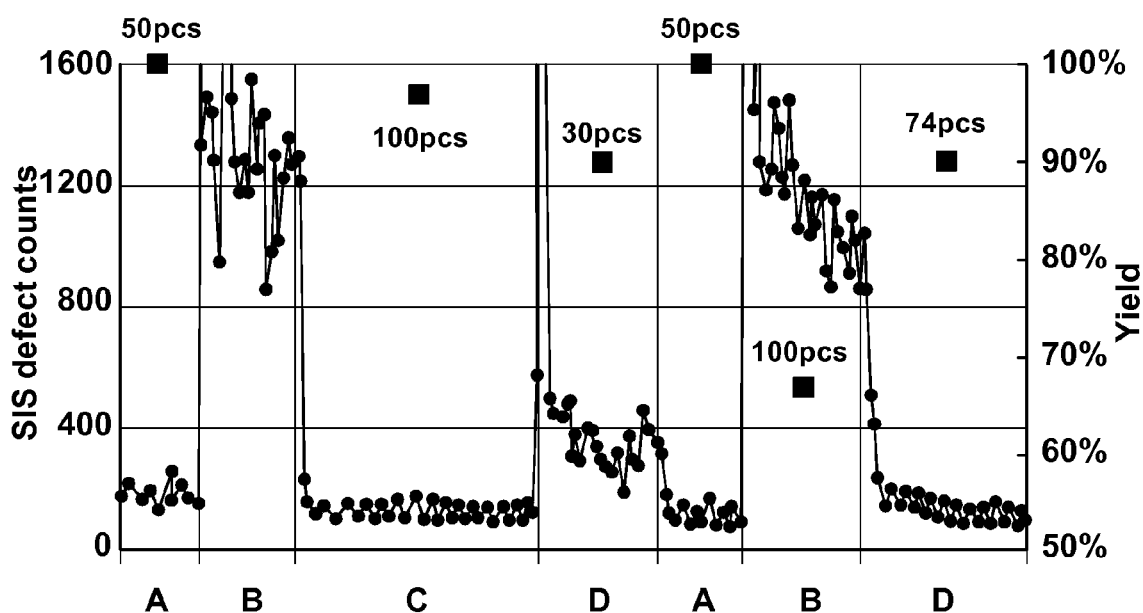
FIG. 13 compares the defects and yields of glass sheets subjected to a Visqueen peeled film, untreated paper, erucamide coated paper, and single layer polymer film.

A useful representation of this data is shown in FIG. 13. This figure shows results from BOD through Finishing Testing of Materials. Note that SIS defect counts while not including rejectable defects are a measure of surface cleanliness of the substrates, and therefore an indicator of performance beyond yield criteria. FIG. 13 shows that the lowest number of defects and best yields were achieved using manually peeled Visqueen film (data labeled A), the Coated paper (data labeled C), and the SL polymer film (data labeled D), whereas the worst yields were from the uncoated paper (data labeled B).

Example 4

Contact Angle Measurements

Figure 14:
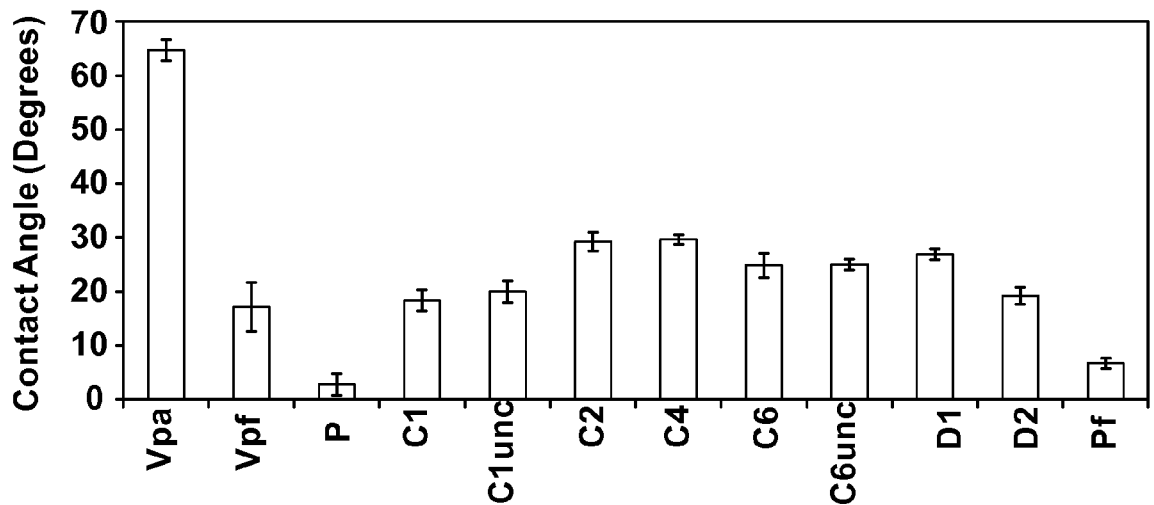
FIG. 14 shows the contact angle on glass treated with a Visqueen peeled film, untreated paper, erucamide and stearamide imbibed paper under different papermaking conditions, and single layer polymer film.

When the contact angle measured for a treated sheet of glass is higher, it means there is more of the treatment material on the glass. FIG. 14 first shows the anticipated range of contact angles expected from the surface of glass after peeling off Visqueen film, which included erucamide. The aged BOD surface is the contact angle that resulted from many months of aging BOD sourced glass in a crate before peeling (indicated as Vpa in FIG. 14), while other contact angle data was obtained by using washed glass with laminated Visqueen film which was immediately stripped (indicated as Vpf in FIG. 14). This table verifies that aging deposits more erucamide on the surface of the glass Vpa, raising the contact angle relative to the glass with the stripped laminated Visqueen film Vpf. In FIG. 13 the 100% yields are observed for the aged Visqueen film peeled surfaces. The next small bar P of FIG. 14 represents the glass samples held overnight with only the dense pack uncoated paper; this had almost no effect, and low contact angle indicates no transfer of coating material to the glass. The next set of bars C1, C1unc, C2, C4, C6 and C6unc show the various conditions from the slip agent coated paper trials, with the unc in C1unc and C6unc indicating uncalendared paper, with the remaining bars being calendared paper. D1 and D2 were dampener trials of paper having 10% solids, erucamide loading. The last bar at the end Pf was for the single layer polymer film run in FIG. 13. The higher contact angle of C1 versus the polymer film concurs with the yield of 97% versus 90% observed in FIG. 13.

All conditions were further lab-tested for stain and scratch as Table 1 shows, and Condition C4, showed favorable results. Condition C4 with alkyl ketene dimer (AKD) showed a higher contact angle (FIG. 14) than other conditions of coated paper. For this reason, the next trial used paper made by C4.

Example 5

The glass was placed in contact with the coated paper and held overnight in a clean room. This simulates the transfer of slip agent due to compression of the glass sheets in a stack. The glass surfaces after paper contact were examined to confirm the transfer of slip between paper and glass surfaces. Many analytical techniques were attempted but were unable to determine this transfer due to the presence of very small particles of erucamide not uniformly spread on the surface of glass with low coverage. The mass ESI (Electrospray ionization)-MS-MS, mass spectrometry results did show both the identity and amount, using a solvent wash of the surface. Table 5 shows ESI MS-MS results for several trial paper coating conditions.

TABLE 5

Erucamide Transfer to Glass from Paper

| Paper Type for Contact | Stearamide (ng/6.4 cm2) at glass surface | Erucamide (ng/6.4 cm2) at glass surface |
| --- | --- | --- |
| Dampener, 10% solids, Stearamide | 1120 | Detected |
| | 5453 | Detected |
| 2-Sided Stearamide w/AKD | 1696 | Detected |
| Uncalendered | 1303 | Detected |
| 2-Sided Stearamide w/AKD | 2206 | Detected |
| | 2071 | Detected |
| 2-Sided Erucamide w/AKD | | 262 |
| | | 163 |
| 1-Sided Erucamide | | 55 |
| Visqueen, peeled | | 240 |
| | | 134 |
| Uncoated Paper | Not Detected | Not Detected |
| | Not Detected | Not Detected |

Each test was done in duplicate. Stearamide coatings were shown to be contaminated with erucamide, which shows that the stearimide samples were not pure. Erucamide with AKD showed transfer to the glass surface in the range of peeled Visqueen film, with 1-sided Erucamide coating transferring less to glass, although the COF of the 1-sided (Table 2) was lower. The uncoated paper showed no slip agents. The high amounts of stearamide transferred were not easily washed off the surfaces as shown in Table 3. The highest amount of stearamide transferred was without AKD but at the dampener, where a higher surface concentration is likely since the paper is near the end of the papermaking process, and completely formed, and denser versus at the size press.

Example 6

Figure 15:
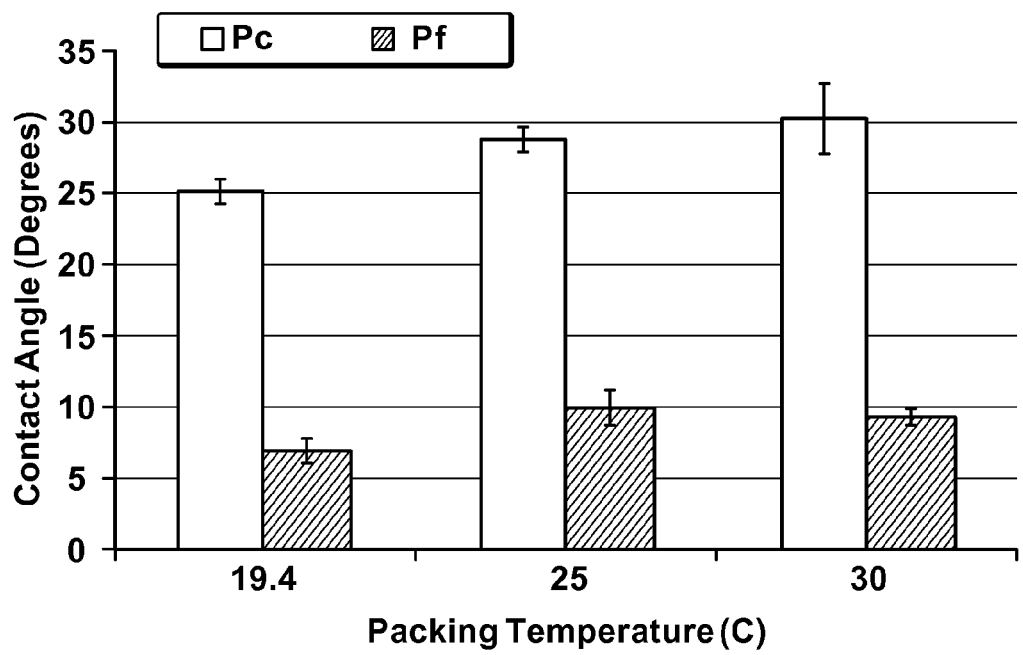
FIG. 15 shows the effect of temperature on the contact angle on glass treated with erucamide imbibed paper and single layer polymer film.

To enhance the amount of erucamide transferred from interleaf paper or polymer film interleaf, the materials were tested at elevated temperatures. There were higher contact angles with increased temperatures for the two sided erucamide coated paper, Pc, but the effect for the film, Pf, was much less significant than for the paper. There is a possibility that transfer of glass at higher than usual temperatures in the shipment container with paper contact, or temperature rises in warehouses could enhance the surface protection of coated papers. FIG. 15 shows this result. The base temperature of 19.4 degrees C. was the clean room temperature.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A method of protecting glass sheets from scratching comprising applying a discontinuous layer of slip agent to a surface of a glass sheet before a finishing operation, wherein said slip agent is applied to said glass sheet by transferring said slip agent from a carrier membrane including said slip agent, removing said carrier before said finishing operation, said slip agent comprising a long chain fatty ester or long chain fatty amide, and inhibiting scratching of said glass sheet during said finishing operation using said discontinuous layer of slip agent.

2. The method of claim 1 wherein said application of said slip agent to said surface of said glass sheet forms surface roughness on said glass sheet comprising said slip agent.

3. The method of claim 1 wherein said long chain fatty amide is erucamide.

4. The method of claim 1, wherein said slip agent is present on said glass sheet in an amount ranging from 1 to 10,000 nanograms per centimeter$^2$.

5. The method of claim 1, wherein said slip agent is present on said glass sheet in an amount ranging from 1 to 3,000 nanograms per centimeter$^2$.

6. The method of claim 1, wherein said slip agent is present on said glass sheet in an amount ranging from 1 to 500 nanograms per centimeter$^2$.

7. The method of claim 1, wherein the carrier membrane is a paper or film.

8. The method of claim 7, wherein said slip agent is applied to said glass sheet using a process selected from the group consisting of a pressure wall process, a laminated film process, and a stacked glass with interleaf compression process.

9. The method of claim 8, comprising the steps of:
   a) positioning said paper or film on one of said glass sheets such that said slip agent included on said paper or film is in contact with said glass sheet;
   b) pressing said paper or film against said glass sheet;
   c) transferring at least a portion of said slip agent from the paper or film onto said glass sheet; and
   d) removing said paper or film from said glass sheet, while leaving said slip agent on the glass sheet.

10. The method of claim 9 further comprising the steps of:
   e) placing an additional said glass sheet against an interleaf paper including said slip agent such that said slip agent is presented on said interleaf paper is in contact with said additional said glass sheet;
   f) repeating said steps a) and e) until a stack of said glass sheets is arranged with said interleaf paper between adjacent said glass sheets;
   g) wherein said steps b) and c) occur when said interleaf paper located between said glass sheets is compressed as a result of a weight of said stack; and
   h) resisting scratching from glass or other particles on the glass sheets when the glass sheets move relative each other with the interleaf paper.

\* \* \* \* \*